(12) United States Patent
Baldemair et al.

(10) Patent No.: US 10,757,689 B2
(45) Date of Patent: Aug. 25, 2020

(54) ALLOCATION OF ACKNOWLEDGEMENT RESOURCES

(71) Applicant: TELEFONAKTIEBOLAGET LM ERICSSON (PUBL), Stockholm (SE)

(72) Inventors: Robert Baldemair, Solna (SE); Erik Dahlman, Stockholm (SE); Sorour Falahati, Stockholm (SE); Daniel Larsson, Lund (SE); Stefan Parkvall, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 95 days.

(21) Appl. No.: 15/779,955

(22) PCT Filed: Apr. 13, 2018

(86) PCT No.: PCT/SE2018/050378
§ 371 (c)(1),
(2) Date: May 30, 2018

(87) PCT Pub. No.: WO2018/203791
PCT Pub. Date: Nov. 8, 2018

(65) Prior Publication Data
US 2019/0394767 A1  Dec. 26, 2019

Related U.S. Application Data

(60) Provisional application No. 62/502,217, filed on May 5, 2017.

(51) Int. Cl.
*H04W 72/04*   (2009.01)
*H04L 1/00*    (2006.01)
(Continued)

(52) U.S. Cl.
CPC ....... *H04W 72/0413* (2013.01); *H04L 1/0026* (2013.01); *H04L 1/1819* (2013.01);
(Continued)

(58) Field of Classification Search
CPC ............ H04W 72/0413; H04W 52/146; H04L 1/1819; H04L 1/0026; H04L 5/0055; H04L 5/0082
See application file for complete search history.

(56) References Cited

U.S. PATENT DOCUMENTS 9,608,910 B2    3/2017  Han et al.
10,333,679 B2 * 6/2019  Ahn .......................... H04L 5/00
(Continued)

FOREIGN PATENT DOCUMENTS

EP   2639984 A2   9/2013
RU   2549365 C2   4/2015
(Continued)

OTHER PUBLICATIONS

Riaz Mondal et al., "An Efficient Grid-based RF Fingerprint Positioning Algorithm for User Location Estimation in Heterogeneous Small Cell Networks", In Proceedings of 2014 International conference on localization and GNSS (ICL-GNSS), 2014, pp. 1-5.
(Continued)

*Primary Examiner* — Christopher P Grey
(74) *Attorney, Agent, or Firm* — Patent Portfolio Builders PLLC

(57) ABSTRACT

Systems and methods are provided for allocation of acknowledgement resources. In an embodiment, a method of transmitting control information to a communication network may be implemented in a wireless device. The method may include being configured with at least two physical uplink control channel (PUCCH) opportunities, each of the at least two PUCCH opportunities identifying uplink
(Continued)

resources to be used for transmitting control information to the communication network. The method may further include receiving an acknowledgement resource indication (ARI) indicating one of the configured at least two PUCCH opportunities to be used for transmitting control information associated with the DL transmission.

47 Claims, 4 Drawing Sheets

(51) Int. Cl.
      *H04L 1/18*     (2006.01)
      *H04L 5/00*     (2006.01)
      *H04W 52/14*     (2009.01)

(52) U.S. Cl.
      CPC .......... *H04L 5/0055* (2013.01); *H04L 5/0082* (2013.01); *H04W 52/146* (2013.01)

(56) References Cited

U.S. PATENT DOCUMENTS

| | | | | |
|---|---|---|---|---|
| 2012/0207107 A1* | 8/2012 | Li | ........................ | H04W 52/58 370/329 |
| 2012/0320848 A1* | 12/2012 | Chen | .................... | H04W 28/06 370/329 |
| 2013/0229997 A1* | 9/2013 | Lunttila | ................ | H04W 72/06 370/329 |
| 2014/0036704 A1* | 2/2014 | Han | ...................... | H04W 28/12 370/252 |
| 2014/0079008 A1 | 3/2014 | Park | | |
| 2015/0173065 A1* | 6/2015 | Fu | ......................... | H04L 1/1861 370/280 |
| 2017/0366323 A1* | 12/2017 | Ahn | .......................... | H04L 5/00 |
| 2018/0098345 A1* | 4/2018 | Tiirola | ............. | H04W 72/1289 |

FOREIGN PATENT DOCUMENTS

| | | |
|---|---|---|
| RU | 2593385 C1 | 8/2016 |
| RU | 2597006 C2 | 9/2016 |
| WO | 2016108556 A1 | 7/2016 |

OTHER PUBLICATIONS

International Search Report and Written Opinion in International Application No. PCT/SE2018/050378 dated Jun. 22, 2018.

Office Action in corresponding Russian Application No. 2019138639 dated Jun. 22, 2020 (all references not cited herewith have been previously made of record).

* cited by examiner

ALLOCATION OF ACKNOWLEDGEMENT RESOURCES

TECHNICAL FIELD

Embodiments of the subject matter disclosed herein generally relate to communications networks, and, more particularly, to methods and devices for allocating acknowledgement resources.

BACKGROUND

Wireless communications networks may implement Automatic Repeat Request (ARQ) or hybrid-ARQ (HARQ), wherein HARQ also may include forward error connection. In such a communications network, transmitting devices such as a wireless device may be required to send acknowledgement information (i.e., feedback) to the receiving device (such as a network node) indicating the result of decoding a transport block or codeword (e.g., ACK/NACK or ACK/NAK feedback). The ACK/NACK related to downlink (DL) transmissions may be transmitted in the uplink (UL). The feedback may be used to trigger fast retransmissions.

In some communications networks such as 3GPP networks, explicit resource allocation may be supported. A DL transmission may include Downlink Control Information (DCI) in addition to DL data. DCI may be used to schedule a slot for reporting acknowledgement information (e.g., HARQ feedback) to be sent from the wireless device to the network node. In addition to this timing information, the wireless device also needs to know the exact acknowledgement resource (physical uplink control channel (PUCCH) resource) that should be used. PUCCH resources may be configured by higher layers and DCI may indicate which of the configured resources to use. Which resources to use may be communicated as an acknowledgement-resource-indication (ARI).

FIG. 1 is a schematic representation of a time frequency diagram, in which DL transmission 100 includes DCI 102 in addition to DL data. The DL transmission 100 is scheduled in slot n. DCI 102 indicates that acknowledgement information (e.g., HARQ feedback) should be sent in slot n+1 using the PUCCH. In addition to this timing information, the ARI communicates which PUCCH resource should be used (e.g., ARI=1 communicates that PUCCH resource 1 should be used).

FIG. 2 is a schematic representation of a time frequency diagram, in which multiple DL transmissions 200, 202, 204 include DCI 0 206, DCI 1 208, DCI 2 210, respectively, in addition to DL data 0, 1, and 2. DL transmissions 200, 202, 204 are scheduled in slots n, n+1, and n+3, respectively. Due to the lack of PUCCH opportunities (e.g., no UL opportunities), acknowledgement feedback is requested in slot n+3 following DL data 2. In addition to the timing information, ARI in DCI 0 communicates that PUCCH resource 0 should be used for DL transmission 200 acknowledgement information, ARI in DCI 1 communicates that that PUCCH resource 2 should be used for DL transmission 202 acknowledgement information, and ARI in DCI 2 communicates that PUCCH 3 should be used for DL transmission 204 acknowledgements. The instances of ARI included in DCI 0, DCI 1, and DCI 3 point at different PUCCH resources to avoid collisions.

However, the present inventors have recognized that the above acknowledgement information communication has drawbacks as discussed herein. Accordingly, it would be desirable to provide methods and devices for allocated acknowledgement resources.

SUMMARY

Embodiments may allow for allocated acknowledgement resources. This can provide, for example, reduced numbers of acknowledgement transmissions, less errors in the transmissions, and avoid the need for power back-offs during the transmissions.

According to an embodiment, a method of transmitting control information to a communication network may be provided. The method may be implemented in a wireless device. The method may include being configured with at least two physical uplink control channel (PUCCH) opportunities. Each of the at least two PUCCH opportunities may identify uplink (UL) resources to be used for transmitting control information to the communication network. The method may further include receiving an assignment of radio resources to be used for receiving a downlink (DL) transmission from a network node of the communication network. The method may further include receiving an acknowledgement-resource-indication (ARI) indicating one of the configured at least two PUCCH opportunities to be used for transmitting control information associated with the DL transmission. The method may further include transmitting the control information associated with the DL transmission to the network node on at least a subset of the UL resources identified by the indicated PUCCH opportunity. The indicated PUCCH opportunity may include one or more of a PUCCH format, a PUCCH duration, a PUCCH payload size, and a PUCCH bandwidth.

According to another embodiment, a wireless device may be provided. The wireless device may include a communication interface and processing circuitry configured to cause the wireless device perform operations. The wireless device may be configured with at least two physical uplink control channel (PUCCH) opportunities. Each of the at least two PUCCH opportunities may identify uplink (UL) resources to be used for transmitting control information to a communication network. The wireless device may receive an assignment of radio resources to be used for receiving a downlink (DL) transmission from a network node of the communication network. The wireless device may receive an acknowledgement-resource-indication (ARI) indicating one of the configured at least two PUCCH opportunities to be used for transmitting control information associated with the DL transmission. The wireless device may transmit the control information associated with the DL transmission to the network node on at least a subset of the UL resources identified by the indicated PUCCH opportunity. The indicated PUCCH opportunity may include one or more of a PUCCH format, a PUCCH duration, a PUCCH payload size, and a PUCCH bandwidth.

According to another embodiment, a method of receiving control information at a network node of a communication network may be provided. The method may include obtaining a configuration of at least two physical uplink control channel (PUCCH) opportunities. Each PUCCH may identify uplink (UL) resources to be used for receiving control information from wireless devices in coverage of the communication network. The method may include assigning radio resources to be used for transmitting a downlink (DL) transmission to a wireless device. The method may include transmitting an acknowledgement resource indication (ARI) to the wireless device. The ARI may indicate one of the configured at least two PUCCH opportunities to be used for receiving control information associated with the DL transmission. The method may include receiving the control information from the wireless device on at least a subset of the indicated PUCCH opportunity. A PUCCH opportunity may include one or more of a PUCCH format, a PUCCH duration, a PUCCH payload size, and a PUCCH bandwidth in which the control information is to be transmitted.

According to another embodiment, a network node of a communication network may be provided. The network node may include a communication interface and processing circuitry configured to cause the network node to perform operations. The network node may obtain a configuration of at least two physical uplink control channel (PUCCH) opportunities. Each PUCCH may identify uplink (UL) resources to be used for receiving control information from wireless devices in coverage of the communication network. The network node may assign radio resources to be used for transmitting a downlink (DL) transmission to a wireless device. The network node may transmit an acknowledgement resource indication (ARI) to the wireless device. The ARI may indicate one of the configured at least two PUCCH opportunities to be used for receiving control information associated with the DL transmission. The network node may receive the control information from the wireless device on at least a subset of the indicated PUCCH opportunity. A PUCCH opportunity may include one or more of a PUCCH format, a PUCCH duration, a PUCCH payload size, and a PUCCH bandwidth in which the control information is to be transmitted.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
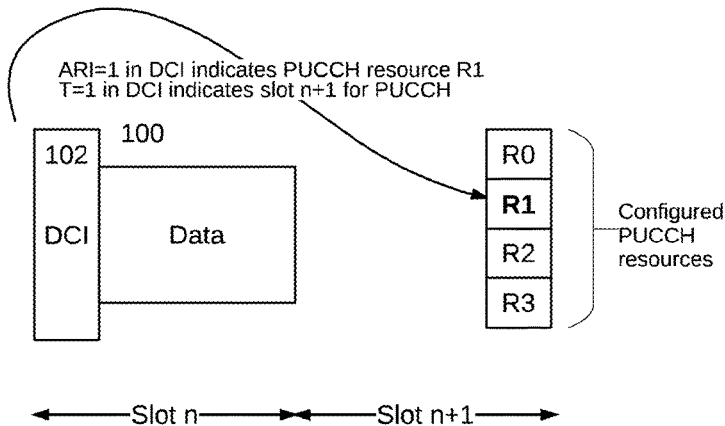
FIG. 1 is a schematic representation of a time frequency diagram, in which a downlink (DL) transmission includes downlink control information (DCI) in addition to DL data.

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Features, structures or characteristic described as being separate may be combined into a single feature, structure, or characteristic. Similarly, features, structures or characteristics described as being individual may be split into two or more features, structures or characteristics.

Within the context of the present disclosure, the term "communication network" or short "network" may particularly denote a collection of nodes or entities, related transport links, and associated management needed for running a service, for example a telephony service or a packet transport service. Depending on the service, different node types or entities may be used to realize the service. The communication network may be owned by a network operator or operated on the network operator's behalf and may offer the implemented services to its subscribers. Typical examples of a communication network are radio access network, such as WLAN/Wi-Fi™ and cellular networks like 2G/GSM, 3G/UMTS, 4G/LTE and New Radio (NR).

Within the context of the present disclosure, each of the terms "wireless device" and "user equipment" (UE) refers to a device for instance used by a person for his or her personal communication. It can be a telephone-type of device, for example a telephone or a SIP phone, cellular telephone, a mobile station, cordless phone, or a personal digital assistant type of device like a laptop, notebook, notepad equipped with a wireless data connection, or table computer. The wireless device may also be associated with non-humans like animals, plants, or even machines, and may then be configured for machine-type communication, machine-to-machine communication, device-to-device communication or sidelink. A wireless device may be equipped with a SIM (Subscriber Identity Module) comprising unique identities such as IMSI (International Mobile Subscriber Identity) and/or TMSI (Temporary Mobile Subscriber Identity) associated with a subscriber using the wireless device. The presence of a SIM within a wireless device may customize the wireless device uniquely with a subscription of the subscriber. In the present disclosure, a wireless device may be a UE.

Within the context of the present disclosure, each of the terms "network node" and "base station" refers to a node of a radio access network that may be used as interface between land-based transport links and radio-based transport links, wherein the radio-based transport link may interface directly with a UE. In different generations of cellular communication, the terms may refer to a BTS, a NodeB, an eNodeB or gNB. In WLAN/Wi-Fi™ architecture, the terms may refer to an Access Point (AP). In the present disclosure, a network node may be a base station.

Figure 2:
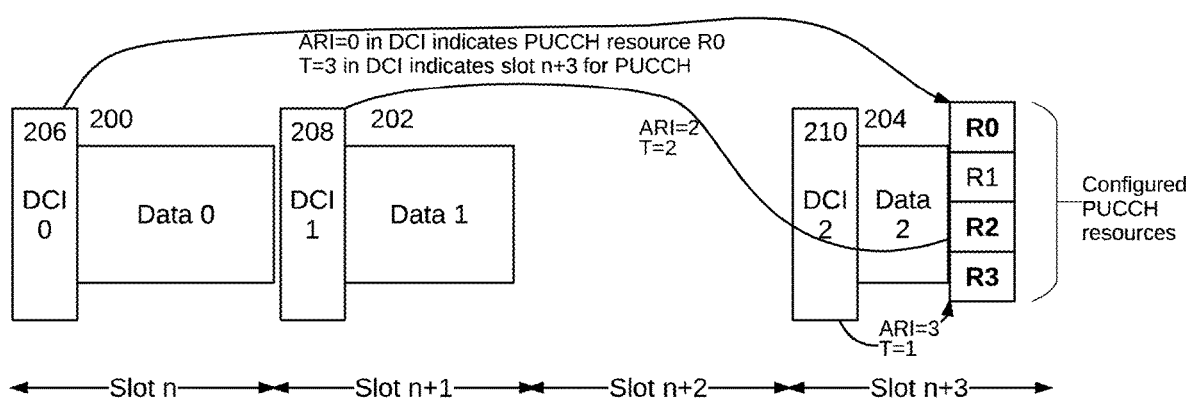
FIG. 2 is a schematic representation of a time frequency diagram, in which multiple DL transmissions include DCI in addition to DL data.

As mentioned above, the present inventors have recognized that existing background acknowledgement information communication has drawbacks. For example, in the example shown in FIG. 2, the wireless device transmits three independent PUCCH in subframe n+3 (i.e., PUCCH resource 0 for DL transmission 200 acknowledgement information, PUCCH resource 2 for DL transmission 202 acknowledgement information, and PUCCH resource 3 for DL transmission acknowledgement 204). This is suboptimal from multiple perspectives.

First, three individual transmissions could be reduced for optimization. Accordingly, one jointly coded transmission with 3 bits (assuming for simplicity each HARQ feedback consists of a single bit) may be more efficient than three individual transmissions. Second, some communications systems (e.g., NR) PUCCH formats may be of low Peak-to-Average-Power-Ratio (PAPR) which may be lost if multiple PUCCH are transmitted simultaneously. Third, depending on the frequency positions of the PUCCH resources, power back-offs might be required to mitigate intermodulation products. These and other drawbacks described herein may be overcome by embodiments of the present invention.

Embodiments of the invention may be put to use in any node in a network that implements transmitter or receiver functionality. One typical implementation is in a wireless device and relates to processing of a downlink transport block with ACK/NACK feedback transmitted on uplink.

Figure 3:
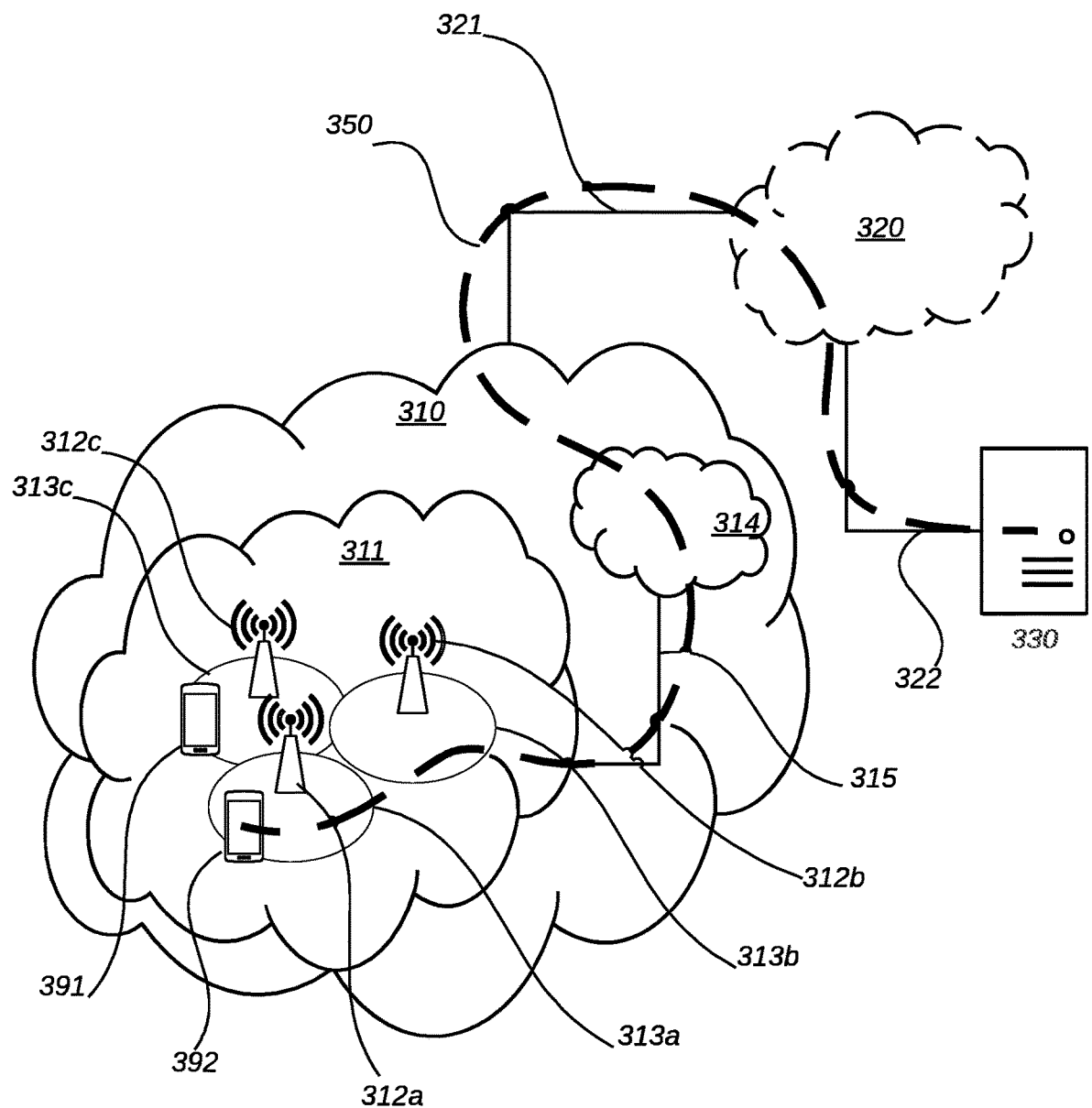
FIG. 3 is a schematic representation of a communications network in accordance with an exemplary embodiment of the present invention.

With reference to FIG. 3, in accordance with an embodiment, a communication system includes a communications network 310, such as a 3GPP-type cellular network, which comprises an access network 311, such as a radio access network, and a core network 314. The access network 311 comprises a plurality of network nodes (e.g., base stations) 312a, 312b, 312c, such as NBs, eNBs, gNBs or other types of wireless access points, each defining a corresponding coverage area 313a, 313b, 313c. Each network node 312a, 312b, 312c is connectable to the core network 314 over a wired or wireless connection 315. A first wireless device 391 located in coverage area 313c is configured to wirelessly connect to, or be paged by, the corresponding network node 312c. A second wireless device 392 in coverage area 313a is wirelessly connectable to the corresponding network node 312a. While a plurality of wireless devices 391, 392 are illustrated in this example, the disclosed embodiments are equally applicable to a situation where a sole wireless device is in the coverage area or where a sole wireless device is connecting to the corresponding network node.

Optionally, the communications network 310 is itself connected to a host computer 330, which may be embodied in the hardware and/or software of a standalone server, a cloud-implemented server, a distributed server or as processing resources in a server farm. The host computer 330 may be under the ownership or control of a service provider, or may be operated by the service provider or on behalf of the service provider. The connections 321, 322 between the telecommunication network 310 and the host computer 330 may extend directly from the core network 314 to the host computer 330 or may go via an optional intermediate network 320. The intermediate network 320 may be one of, or a combination of more than one of, a public, private or hosted network; the intermediate network 320, if any, may be a backbone network or the Internet; in particular, the intermediate network 320 may comprise two or more sub-networks (not shown).

The communications system of FIG. 3 as a whole enables connectivity between one of the connected wireless devices 391, 392 and the host computer 330. The connectivity may be described as an over-the-top (OTT) connection 350. The host computer 330 and the connected wireless devices 391, 392 are configured to communicate data and/or signaling via the OTT connection 350, using the access network 311, the core network 314, any intermediate network 320 and possible further infrastructure (not shown) as intermediaries. The OTT connection 350 may be transparent in the sense that the participating communication devices through which the OTT connection 350 passes are unaware of routing of upstream and downstream communications. For example, a network node 312 may not or need not be informed about the past routing of an incoming downstream communication with data originating from a host computer 330 to be forwarded (e.g., handed over) to a connected UE 391. Similarly, the network node 312 need not be aware of the future routing of an outgoing upstream communication originating from the wireless device 391 towards the host computer 330.

Example implementations, in accordance with an embodiment, of the wireless device, network node and host computer discussed in the preceding paragraphs will now be described with reference to FIG. 4. In a communication system 400, a host computer 410 comprises hardware 415 including a communication interface 416 configured to set up and maintain a wired or wireless connection with an interface of a different communication device of the communication system 400. The host computer 410 further comprises processing circuitry 418, which may have storage and/or processing capabilities. In particular, the processing circuitry 418 may comprise one or more programmable processors, application-specific integrated circuits, field programmable gate arrays or combinations of these (not shown) adapted to execute instructions. The host computer 410 further comprises software 411, which is stored in or accessible by the host computer 410 and executable by the processing circuitry 418. The software 411 includes a host application 412. The host application 412 may be operable to provide a service to a remote user, such as a wireless device 430 connecting via an OTT connection 450 terminating at the wireless device 430 and the host computer 410. In providing the service to the remote user, the host application 412 may provide user data which is transmitted using the OTT connection 450.

The communication system 400 further includes a network node 420 provided, e.g., in a telecommunication system and comprising hardware 425 enabling it to communicate with the host computer 410 and with the wireless device 430. The hardware 425 may include a communication interface 426 for setting up and maintaining a wired or wireless connection with an interface of a different communication device of the communication system 400, as well as a radio interface 427 for setting up and maintaining at least a wireless connection 470 with a wireless device 430 located in a coverage area (not shown in FIG. 3) served by the network 420. The communication interface 426 may be configured to facilitate a connection 460 to the host computer 410. The connection 460 may be direct or it may pass through a core network (not shown in FIG. 3) of the telecommunication system and/or through one or more intermediate networks outside the telecommunication system. In the embodiment shown, the hardware 425 of the network node 420 further includes processing circuitry 428, which may comprise one or more programmable processors, application-specific integrated circuits, field programmable gate arrays or combinations of these (not shown) adapted to execute instructions. The network node 420 further has software 421 stored internally or accessible via an external connection.

The communication system 400 further includes the wireless device 430 already referred to. The hardware 435 of the wireless device 430 may include a radio interface 437 configured to set up and maintain a wireless connection 470 with a network node serving a coverage area in which the wireless device 430 is currently located. The hardware 435 of the wireless device 430 further includes processing circuitry 438, which may comprise one or more programmable processors, application-specific integrated circuits, field programmable gate arrays or combinations of these (not shown) adapted to execute instructions. The wireless device 430 further comprises software 431, which is stored in or accessible by the wireless device 430 and executable by the processing circuitry 438. The software 431 may optionally include a client application 432. The client application 432 may be operable to provide a service to a human or non-human user via the wireless device 430, with the support of the host computer 410. In the host computer 410, an executing host application 412 may communicate with the executing client application 432 via the OTT connection 450 terminating at the wireless device 430 and the host computer 410. In providing the service to the user, the client application 432 may receive request data from the host application 412 and provide user data in response to the request data. The OTT connection 450 may transfer both the request data and the user data. The client application 432 may interact with the user to generate the user data that it provides.

It is noted that the host computer 410, network node 420 and wireless device 430 illustrated in FIG. 3 may be identical or similar to the host computer 330, one of the network nodes 312a, 312b, 312c and one of the wireless devices 391, 392 of FIG. 3, respectively. This is to say, the inner workings of these entities may be as shown in FIG. 4 and independently, the surrounding network topology may be that of FIG. 4.

In FIG. 3, the OTT connection 450 has been drawn abstractly to illustrate the communication between the host computer 410 and the wireless device 430 via the network node 420, without explicit reference to any intermediary devices and the precise routing of messages via these devices. Network infrastructure may determine the routing, which it may be configured to hide from the wireless device 430 or from the service provider operating the host computer 410, or both. While the OTT connection 450 is active, the network infrastructure may further take decisions by which it dynamically changes the routing (e.g., on the basis of load balancing consideration or reconfiguration of the network).

As already outlined, a network node 420 may dynamically schedule downlink transmissions to wireless devices 430. The scheduling may be based on channel state and quality information reports received from the wireless devices 430 on the PUCCH or a physical shared uplink channel or may be based on other factors. The channel state and quality information reports indicate the instantaneous channel conditions as seen by the receiver. In each time interval (e.g., a LTE subframe or NR slot), the network node 420 transmits DCI identifying the wireless devices that have been scheduled to receive data in the current time interval and the resources on which the data is being transmitted to the scheduled wireless devices. The DCI is typically transmitted on a physical downlink control channel in an early portion of the time interval.

ARQ or HARQ may be used to mitigate errors that occur during transmission of data on the DL. When the network node 420 indicates that a wireless device 430 is scheduled to receive a DL transmission, the wireless device 430 may attempt to decode the transmission and transmits acknowledgement information (e.g., an acknowledgement message) to the network node on the physical uplink control or shared channel. The acknowledgement message informs the network node whether the data packet was correctly received by the wireless device 430. The acknowledgement message may be either a positively valued acknowledgement (ACK) indicating a successful decoding or a negatively valued acknowledgement (NACK) message indicating a decoding failure. Based on the acknowledgement message received from the wireless device 430, the base station 420 determines whether to transmit new data (ACK received) or to retransmit the previous data (NACK received). The introduction of an Acknowledgement Resource Indicator (ARI) in connection with LTE carrier aggregation allowed explicit allocation of resources for the acknowledgement message, so that several wireless devices were able to share a pool of UL resources semi-statically reserved for this purpose without collisions. The resource sharing was efficient since the average number of wireless devices simultaneously assigned resources on several DL carriers was small.

To initiate UL transmissions, a wireless device 430 may transmit a scheduling request (SR) to a network node on the PUCCH when it has data to send but no valid uplink grant. The network node 420 allocates uplink resources responsive to the scheduling requests and transmits a scheduling grant to the wireless device 430 on a physical DL control channel. When the data is received, the network node 420 may transmit ACK/NACK signaling to the wireless device 430 on a DL channel to indicate whether the data is received correctly. As an alternative to ACK/NACK signaling, the network node 420 may schedule the wireless device 430 to resend the same UL data.

Returning to DL transmissions, communications networks (e.g., NR) may support a large number of PUCCH formats with different UL resource requirements. In this context, although a resource may be referenced by a single resource index, it may be defined by a combination or one or more of time, frequency, phase rotation, and orthogonal cover code (OCC). A choice of one of the indicated UL resources by the wireless device 330 may represent an acknowledgement feedback value, such as positive or negative acknowledgement. Optionally, the acknowledgement feedback value may be combined with a restriction to a specific portion of the DL transmission (this may allow differently valued acknowledgements to be sent for different portions of the DL transmission) and/or further information, such as a scheduling request, and different degrees of bundling and multiplexing may be applied. As a result of these or similar factors, which are absent in such earlier communication systems where the acknowledgement feedback is of constant length, the number of distinct allocable UL resources may vary between different operating conditions, leading to a considerable gap between the minimum and maximum number of required ARI values. For example, in an exemplary network, the following PUCCH formats having different amounts of UL resources may be supported:

Short PUCCH Format 1: 1 symbol, payload 1-2 bits
Short PUCCH Format 2: 1 symbol, >2 bits
Short PUCCH Format 3: 2 symbol, 1-2 bits
Short PUCCH Format 4: 2 symbol, >2 bits
Long PUCCH Format 1: 4-14 symbols, 1-2 bits
Long PUCCH Format 2: 4-14 symbols, >2 to 10 or few 10 bits
Long PUCCH Format 3: 4-14 symbols, >10 for few 10 bits A straightforward way to accommodate the full range of ARI values would be to allow ARI more resources within DCI. This however would add a constant signaling overhead corresponding to the worst case—the most comprehensive set of acknowledgement feedback values—also in situations where this is not needed. Instead, example embodiments herein propose a wireless device configured with a pool of resources consisting of same or different physical uplink control channel (PUCCH) formats. An acknowledgement-resource-indication (ARI) included in Downlink Control Information (DCI) may be used to select a PUCCH resource (or opportunity). In some embodiments, the ARI may implicitly select a PUCCH format.

In a communication network, a long PUCCH format may exist in different lengths ranging from, e.g., 4-14 symbols. A wireless device may be instructed to use differently long PUCCH in different slots. Time division multiplexing (TDM) of long and short PUCCH from the same wireless device may be supported in a slot. In such a scenario, the long PUCCH must stop before the short PUCCH starts. In another slot where the wireless device should only transmit long PUCCH, the PUCCH may extend until the end of the slot. According to an embodiment of the present invention, variable long PUCCH may be addressed by configuring two or more PUCCH opportunities (e.g., a PUCCH resource pool) with differently long PUCCH. An ARI may be used to select among the different PUCCH opportunities.

Figure 4:
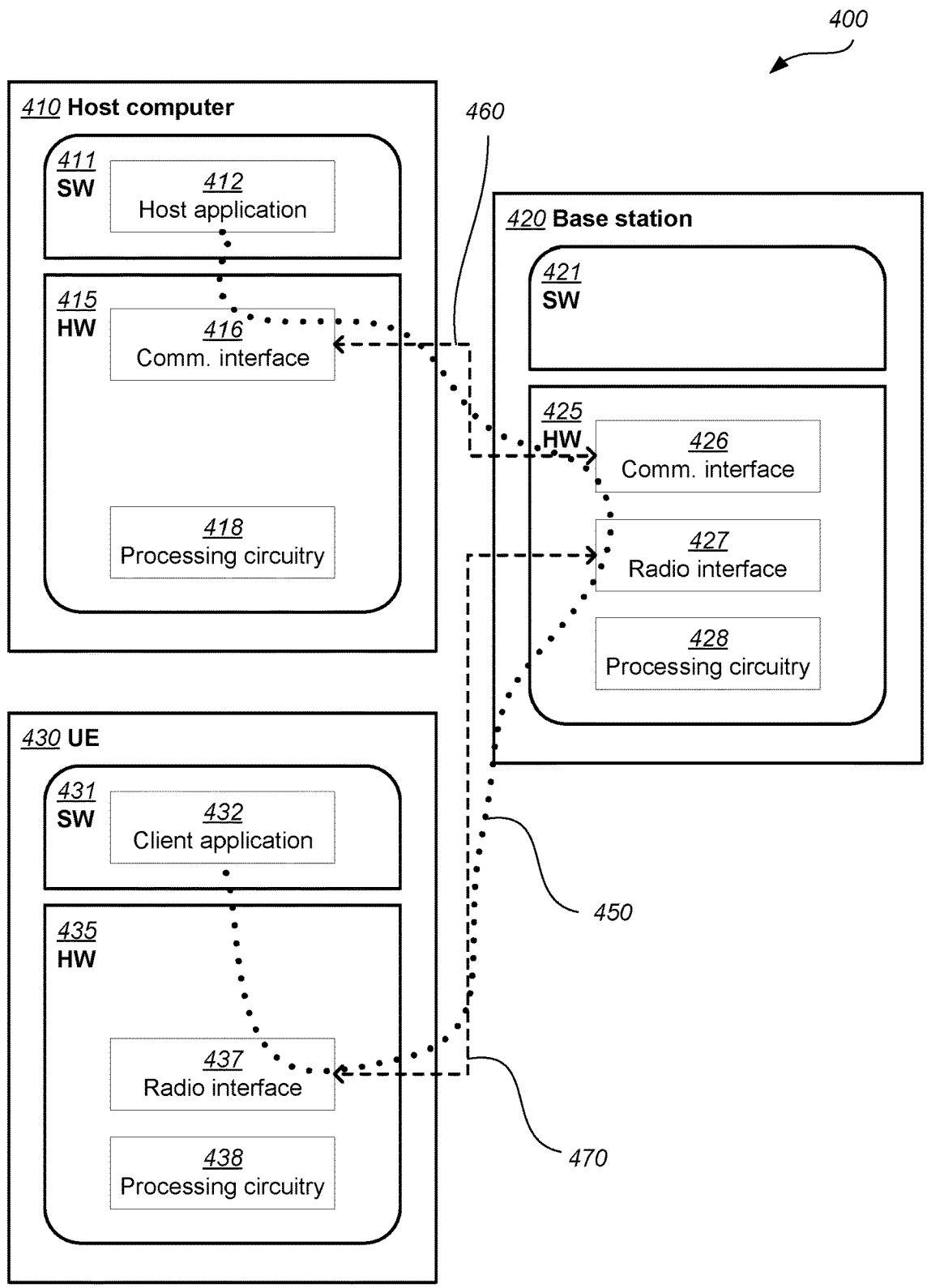
FIG. 4 is a schematic representation of a host computer communicating via a network node with a wireless device over a wireless connection in accordance with an exemplary embodiment of the present invention.
Figure 5:
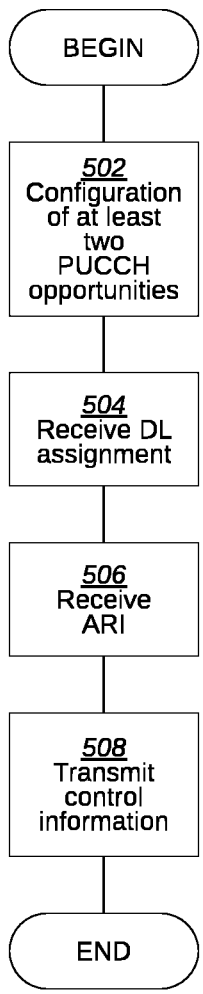
FIG. 5 is a schematic representation of a method of transmitting control information to a communications network, in accordance with an exemplary embodiment of the present invention.

FIG. 5 is a schematic representation of a method 500 of transmitting control information to a communications network, in accordance with an exemplary embodiment of the present invention. The method 500 may be implemented in a wireless device of the communications network, such as the wireless device 430 of communications network 400 shown in FIG. 4.

In operation 502, the wireless device may be configured with at least two physical uplink control channel (PUCCH) opportunities. Each of the at least two PUCCH opportunities may identify uplink (UL) resources that may be used for transmitting control information to the communication network. The at least two PUCCH opportunities may identify at least one of different PUCCH formats, different PUCCH durations, different PUCCH payload sizes and different PUCCH bandwidths. An indicated PUCCH opportunity may include one or more of a PUCCH format, a PUCCH duration, a PUCCH payload size, and a PUCCH bandwidth.

In some embodiments, the indicated PUCCH opportunity may include further properties. As non-limiting examples, the indicated PUCCH opportunity may further include a PUCCH transmit diversity gain. The indicated PUCCH opportunity may further include a PUCCH power control setting. In some embodiments, the indicated PUCCH opportunity may multiplex with other kinds of uplink control information (UCI). For example, the indicated PUCCH opportunity may further include UCI. The UCI may include one or more of a channel status information (CSI), a channel quality indicator (CQI), and a scheduling request (SR).

The UL resources may be distinguishable by at least one of: time, frequency, and code. In one embodiment, the UL resources to be used for transmitting control information to the communication network may include multiple UL carriers. An acknowledgment resource indication (ARI)(discussed below) indicating one of the configured at least two PUCCH opportunities may be dependent upon a carrier activation state.

The wireless device may be configured with the at least two PUCCH opportunities by semi-static signaling. For example, Radio Resource Control (RRC) signaling may be used. If a network node (such as the network node 420 of FIG. 4) is responsible for configuring the PUCCH opportunities, it may signal the configuration semi-statically to the wireless device 430. If instead a different entity of the communication network 400 is responsible for configuring the PUCCH opportunities, then both the wireless device 430 and the network node 420 may receive semi-static signaling indicative of the configuration.

In operation 504, the wireless device may receive an assignment of radio resources to be used for receiving a downlink (DL) transmission from network node 420 of the communication network 400.

In operation 506, the wireless device 430 may receive an acknowledgement-resource-indication (ARI) indicating one of the configured at least two PUCCH opportunities to be used for transmitting control information associated with the DL transmission. The ARI may be specific to the wireless device 430, or alternatively, may be shared among multiple wireless devices. The indicated PUCCH opportunity may include one or more of a PUCCH format, a PUCCH duration, a PUCCH payload size, and a PUCCH bandwidth. The control information may comprise acknowledgement information associated with the DL transmission. For example, the acknowledgement information may be hybrid automatic repeat request (HARQ) feedback. The ARI may be received in a message comprising additional information. For example, the message may include a variable separation of a time interval of the DL transmission and a time interval of the control information. In one embodiment, the message may comprise the ARI and the assignment of radio resources.

In an embodiment, the wireless device may receive incomplete information. For example, the receiving of the ARI may include receiving a subset of properties of the PUCCH format, the PUCCH duration, the PUCCH payload size, and the PUCCH bandwidth. Receiving a subset may include receiving a subset of just one of the properties and full info with respect to other properties and/or receiving just one of the PUCCH format, the PUCCH duration, the PUCCH payload size, and the PUCCH bandwidth. In such a scenario, the wireless device may, e.g., compare the received information with a predetermined table of configured PUCCH formats to determine which PUCCH format to apply. That is, the wireless device may resolve the PUCCH format by comparing the subset with a predetermined table of PUCCH format information for two or more PUCCH formats to determine the PUCCH format. This approach may reduce transmission overhead.

As a specific non-limiting example, receiving of the subset may include receiving the UL resources identified by the indicated PUCCH opportunity and the PUCCH payload size. The non-received PUCCH information includes the PUCCH format. As another example, receiving the subset may include receiving the UL resources identified by the indicated PUCCH opportunity and the PUCCH format. The non-received PUCCH information may include one or more of a PUCCH duration, a PUCCH payload size, and a PUCCH bandwidth.

In operation 508, the wireless device may transmit the control information associated with the DL transmission to the network node on at least a subset of the UL resources identified by the indicated PUCCH opportunity.

Figure 6:
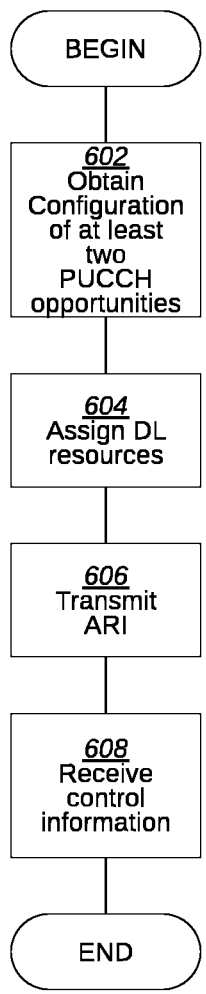
FIG. 6 is a schematic representation of method for receiving control information at a network node of a communication network, in accordance with an exemplary embodiment.

FIG. 6 is a schematic representation of method for receiving control information at a network node of a communication network, such as network node 420 of communications network 400 of FIG. 4. Some aspects already described herein with respect to transmission that one of ordinary skill in the art can appreciate apply similarly to reception are omitted in the interest of brevity.

In operation 602, a configuration of at least two physical uplink control channel (PUCCH) opportunities may be obtained by the network node 420. Each of the at least two PUCCH opportunities may identify uplink (UL) resources to be used for receiving control information from wireless devices in coverage of the communication network 400. The obtaining of a configuration of the PUCCH opportunities may include determining the configuration. The obtaining of the configuration may further include transmitting semi-static signaling to the wireless device 430. The obtaining of the configuration of the PUCCH opportunities may include receiving information from a different node of the communication network.

In operation 604, the network node 420 may assign radio resources to be used for transmitting a downlink (DL) transmission to a wireless device.

In operation 606, the network node 420 may transmit an acknowledgement resource indication (ARI) to the wireless device 430. The ARI may indicate one of the configured at least two PUCCH opportunities to be used for receiving control information associated with the DL transmission. The ARI information may be a wireless device specific configuration. Alternatively, the ARI may be shared among multiple wireless devices. A PUCCH opportunity includes one or more of a PUCCH format, a PUCCH duration, a PUCCH payload size, and a PUCCH bandwidth in which the control information is to be transmitted.

In operation 608, the network node may receive the control information from the wireless device on at least a subset of the indicated PUCCH opportunity.

Further developments of the example embodiments illustrated in FIGS. 5 and 6 will now be discussed. The resources in the configured PUCCH pool can be of a different or a same format. The same format can be configured multiple times on different resources. In the case of PUCCH formats with variable length, the same PUCCH format with different lengths can be configured. Some PUCCH formats may support different bandwidths, e.g., number of physical resource blocks (PRBs) allocated to PUCCH. In the case of PUCCH formats with variable bandwidth, the same PUCCH format with different bandwidths can be configured.

In some embodiments, the configured formats can occupy (partly) overlapping resources or disjoint resources.

Some PUCCH formats may support a variable payload size. In such a scenario, an entry in the PUCCH pool may even be tagged with a payload, e.g., a wireless device may be configured with two Short PUCCH formats 2 (on the same or different resources) for <=11 bits and >11 bits, respectively. In an embodiment, the same PUCCH format (with different payload sizes) may have different channel encoding schemes. Alternatively, the coding scheme does not follow from the payload size but may be part of a PUCCH format definition.

A PUCCH pool entry could also specify if ACK/NACK bit bundling should be applied (the same format can support bundling or no bundling, therefore bundling yes/no could be part of a PUCCH pool entry configuration). Bundling could be applied across ACK/NACK bits of a multi-layer transmission requiring more than one ACK/NACK bit, across DL assignments in time, or across carriers (and combinations thereof).

In some embodiments ARI together with a payload size may be used to select a PUCCH resource and format. For example, ARI may indicate the PUCCH resource and the payload size may determine the PUCCH format. Alternatively, ARI may specify both PUCCH resource and format and the payload size may determine the size of the payload container used in the PUCCH. The payload size may be the true payload size (based on the DL assignments it received) or a "virtual payload size", e.g., signaled to the UE with the goal to select a PUCCH payload container size. The virtual payload size may be derived from Downlink Assignment Indicator (DAI) bits included in the DCI that tells the UE about scheduling history (i.e., how many DL assignments have been scheduled so far within a time window). This approach may help a wireless device to avoid error cases in ACK/NACK reporting in the event some DL assignment information is lost. Alternatively, the virtual payload size may be explicitly signaled to the UE.

The format and size of the HARQ feedback is sometimes also referred to as HARQ codebook. If the container size changes based on (virtual) payload size, this may be denoted fast or dynamic HARQ codebook adaptation. If the payload container size is based on slowly changing quantities (such as semi-static RRC configurations), this may be referred to as slow or static HARQ codebook adaptation. A resource in the PUCCH pool can be tagged with slow or fast HARQ codebook adaptation.

If a PUCCH format supports variable bandwidth, the bandwidth can be part of the configuration and different resources in the PUCCH pool could be the same format but of different bandwidth (as described above).

Alternatively, the resource configuration in the PUCCH pool may only describe a starting or reference frequency position of the PUCCH resource and the bandwidth may be derived from the HARQ codebook size. In this case, a PUCCH resource may only grow into one frequency direction with increasing HARQ codebook size. Alternatively, a PUCCH resource may grow into a positive or negative frequency direction with increasing HARQ codebook size, and the growth direction may be part of the resource configuration. Having PUCCH resources growing into a negative or positive frequency direction may help in better utilizing PUCCH resources.

Entries in the PUCCH pool can be on the same or different UL carriers (in case a UE is configured with multiple UL component carriers in carrier aggregation (CA) or dual connectivity (DC) setup.). The UL carrier used for PUCCH transmission may be implicitly selected by ARI.

Furthermore, if fast UL carrier activation/de-activation is supported, multiple PUCCH pools may be configured for the different activation states (e.g., only UL component carrier (CC1) active, only CC2 active, CC1 and CC2 active). For the three cases, PUCCH resources pool may contain only PUCCH resources on CC1, on CC2, or on both. If activation status is not considered and only a single pool is configured, some PUCCH resources may be on a de-activated UL carrier and may not be used. The ARI may still be able to point to all configured resources, which may be a waste of ARI (and thus DCI bits) and furthermore may reduce network flexibility since only a subset of the configured PUCCH resources may be used if not all UL CC are activated.

A PUCCH pool may contain different PUCCH formats or a same PUCCH format for different reliably levels. With different PUCCH formats, different reliabilities can easily be achieved by design. Using the same PUCCH format, different reliabilities can, e.g., be achieved by different transmit powers. Different entries in the PUCCH pool can thus be configured to use different powers. Typically PUCCH is power controlled. Different entries in the PUCCH pool may have different power offsets assigned which may be used to adjust the PUCCH transmit power.

Different entries in the PUCCH resource pool may have different configurations with respect to PUCCH transmit diversity. Some entries may transmit PUCCH with transmit diversity configuration 1 (e.g., no transmit diversity) while other entries would transmit PUCCH with another transmit diversity. More generally, this may apply to multi-antenna schemes and not only transmit diversity schemes.

Figure 7:
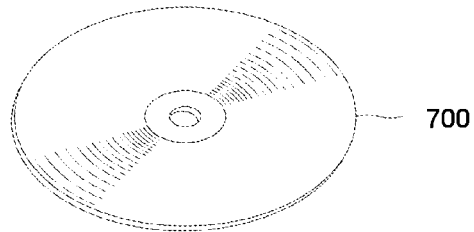
FIG. 7 is a schematic representation of a computer-readable storage medium, in accordance with an exemplary embodiment.

The methods or flowcharts provided in the present application may be implemented in a computer program, software or firmware tangibly embodied in a computer-readable storage medium, such as the computer-readable storage medium 700 of FIG. 7, for execution by a computer or a processor.

It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A communication system including a host computer comprising:
   processing circuitry configured to provide user data; and
   a communication interface configured to forward user data to a cellular network for transmission to a user equipment, UE,
   wherein the UE comprises a radio interface and processing circuitry, the UE's processing circuitry configured to:
   be configured with at least two physical uplink control channel opportunities, PUCCH opportunities, by semi-static signaling, each of the at least two PUCCH opportunities identifying uplink, UL, resources to be used for transmitting control information to a communication network;
   receive an assignment of radio resources to be used for receiving a downlink, DL, transmission from a network node of the communication network;
   receive an acknowledgement resource indication, ARI, indicating one of the configured at least two PUCCH opportunities to be used for transmitting control information associated with the DL transmission; and
   transmit the control information associated with the DL transmission to the network node on at least a subset of the UL resources identified by the indicated PUCCH opportunity,
   wherein the indicated PUCCH opportunity includes one or more of a PUCCH format, a PUCCH duration, a PUCCH payload size, or a PUCCH bandwidth,
   wherein the at least two PUCCH opportunities identify one or more of different PUCCH formats, different PUCCH durations, different PUCCH payload sizes, or different PUCCH bandwidths.

2. The communication system of claim 1, wherein the at least two PUCCH opportunities identify different PUCCH durations.

3. The communication system of claim 1, wherein the control information comprises acknowledgement information associated with the DL transmission.

4. The communication system of claim 3, wherein the acknowledgement information is hybrid automatic repeat request, HARQ, feedback.

5. The communication system of any of claim 1, wherein the UL resources are distinguishable by one or more of: time, frequency, or code.

6. The communication system of claim 1, wherein the ARI is received in a message comprising additional information.

7. The communication system of claim 6, wherein the additional information is a variable separation of a time interval of the DL transmission and a time interval of the control information transmission.

8. The communication system of claim 6, wherein said message comprises the ARI and the assignment of radio resources.

9. The communication system of claim 1, wherein the UE's processing circuitry is further configured to cause the communication system to:
   receive a subset of properties of the PUCCH format, the PUCCH duration, the PUCCH payload size, and the PUCCH bandwidth as part of the ARI; and
   resolve non-received PUCCH information from the received subset.

10. The communication system of claim 9, wherein receiving the subset includes receiving the UL resources identified by the indicated PUCCH opportunity and the PUCCH payload size, and wherein the non-received PUCCH information includes the PUCCH format.

11. The communication system of claim 9, wherein the UE's processing circuitry resolves the PUCCH format by comparing the subset with a predetermined table of PUCCH format information for two or more PUCCH formats to determine the PUCCH format.

12. The communication system of claim 9, wherein receiving the subset includes receiving the UL resources identified by the indicated PUCCH opportunity and the PUCCH format, and wherein the non-received PUCCH information includes one or more of the PUCCH duration, the PUCCH payload size, and the PUCCH bandwidth.

13. The communication system of claim 1, wherein the UL resources to be used for transmitting control information to the communication network include multiple UL carriers.

14. The communication system of claim 13, wherein the ARI indicating one of the configured at least two PUCCH opportunities is dependent upon a carrier activation state.

15. The communication system of claim 1, wherein the indicated PUCCH opportunity further includes a PUCCH transmit diversity gain.

16. The communication system of claim 1, wherein the indicated PUCCH opportunity further includes a PUCCH power control setting.

17. The communication system of claim 1, wherein the indicated PUCCH opportunity further includes uplink control information, UCI.

18. The communication system of claim 17, wherein the UCI includes one or more of a channel status information, CSI, a channel quality indicator, CQI, and a scheduling request, SR.

19. The communication system of claim 1, wherein the PUCCH payload size comprises a derived virtual PUCCH payload size.

20. The communication system of claim 1, further including the UE.

21. The communication system of claim 20, wherein the cellular network further includes a base station configured to communicate with the UE.

22. The communication system of claim 20, wherein:
the processing circuitry of the host computer is configured to execute a host application, thereby providing the user data; and
the UE's processing circuitry is configured to execute a client application associated with the host application.

23. A method implemented in a communication system including a host computer, a base station and a user equipment, UE, the method comprising:
at the host computer, providing user data; and
at the host computer, initiating a transmission carrying the user data to the UE via a cellular network comprising the base station, wherein the UE:
is configured with at least two physical uplink control channel opportunities, PUCCH opportunities, by semi-static signaling, each of the at least two PUCCH opportunities identifying uplink, UL, resources to be used for transmitting control information to the communication network;
receives an assignment of radio resources to be used for receiving a downlink, DL, transmission from a network node of the communication network;
receives an acknowledgement resource indication, ARI, indicating one of the configured at least two PUCCH opportunities to be used for transmitting control information associated with the DL transmission; and
transmits the control information associated with the DL transmission to the network node on at least a subset of the UL resources identified by the indicated PUCCH opportunity,
wherein the indicated PUCCH opportunity includes one or more of a PUCCH format, a PUCCH duration, a PUCCH payload size, or a PUCCH bandwidth,
wherein the at least two PUCCH opportunities identify one or more of different PUCCH formats, different PUCCH durations, different PUCCH payload sizes, or different PUCCH bandwidths.

24. The method of claim 23, further comprising:
at the UE, receiving the user data from the base station.

25. A method implemented in a communication system including a host computer, a base station and a user equipment, UE, the method comprising:
at the host computer, providing user data; and
at the host computer, initiating a transmission carrying the user data to the UE via a cellular network comprising the base station, wherein the base station:
obtains a configuration of at least two physical uplink control channel opportunities, PUCCH opportunities, each PUCCH opportunity identifying uplink, UL, resources to be used for receiving control information from user equipments in coverage of the communication network;
signals the configuration semi-statically to the UE;
assigns radio resources to be used for transmitting a downlink, DL, transmission to the UE;
transmits an acknowledgement resource indication, ARI, to the UE, the ARI indicating one of the configured at least two PUCCH opportunities to be used for receiving control information associated with the DL transmission; and
receives the control information from the UE on at least a subset of the indicated PUCCH opportunity,
wherein a PUCCH opportunity includes one or more of a PUCCH format, a PUCCH duration, a PUCCH payload size, or a PUCCH bandwidth in which the control information is to be transmitted,
wherein the at least two PUCCH opportunities identify one or more of different PUCCH formats, different PUCCH durations, different PUCCH payload sizes, or different PUCCH bandwidths.

26. A communication system including a host computer comprising:
processing circuitry configured to provide user data; and
a communication interface configured to forward the user data to a cellular network for transmission to a user equipment, UE,
wherein the cellular network comprises a base station having a radio interface and processing circuitry, the base station's processing circuitry configured to:
obtain a configuration of at least two physical uplink control channel opportunities, PUCCH opportunities, each PUCCH opportunity identifying uplink, UL, resources to be used for receiving control information from user equipments in coverage of the communication network;
signal the configuration semi-statically to the UE;
assign radio resources to be used for transmitting a downlink, DL, transmission to the UE;
transmit an acknowledgement resource indication, ARI, to the UE, the ARI indicating one of the configured at least two PUCCH opportunities to be used for receiving control information associated with the DL transmission; and
receive the control information from the UE on at least a subset of the indicated PUCCH opportunity,
wherein a PUCCH opportunity includes one or more of a PUCCH format, a PUCCH duration, a PUCCH payload size, or a PUCCH bandwidth in which the control information is to be transmitted,
wherein the at least two PUCCH opportunities identify one or more of different PUCCH formats, different PUCCH durations, different PUCCH payload sizes, or different PUCCH bandwidths.

27. The communication system of claim 26, wherein the obtaining of a configuration of the PUCCH opportunities comprises determining the configuration.

28. The communication system of claim 26, wherein the obtaining of a configuration of the PUCCH opportunities comprises receiving information from a different node of the communication network.

29. The communication system of claim 26, wherein the at least two PUCCH opportunities identify different PUCCH durations.

30. The communication system of claim 26, wherein the control information comprises acknowledgement information associated with the DL transmission.

31. The communication system of claim 30, wherein the acknowledgement information is hybrid automatic repeat request, HARQ, feedback.

32. The communication system of claim 26, wherein the UL resources are distinguishable by one or more of: time, frequency, or code.

33. The communication system of claim 26, wherein the ARI is transmitted in a message comprising additional information.

34. The communication system of claim 33, wherein the additional information is a variable separation of a time interval of the DL transmission and a time interval of the control information transmission.

35. The communication system of claim 33, wherein said message comprises the ARI and the assignment of radio resources.

36. The communication system of claim 26, wherein the transmitting of the ARI includes transmitting a subset of properties of the PUCCH format, the PUCCH duration, the PUCCH payload size, and the PUCCH bandwidth, for the wireless device to resolve non-received PUCCH information from the transmitted subset.

37. The communication system of claim 36, wherein transmitting the subset includes transmitting the UL resources identified by the indicated PUCCH opportunity and the PUCCH payload size, and wherein the non-received PUCCH information includes the PUCCH format.

38. The communication system of claim 36, wherein transmitting the subset includes transmitting the UL resources identified by the indicated PUCCH opportunity and the PUCCH format, and wherein the non-received PUCCH information includes one or more of the PUCCH duration, the PUCCH payload size, and the PUCCH bandwidth.

39. The communication system of claim 26, wherein the UL resources to be used for transmitting control information to the communication network include multiple UL carriers.

40. The communication system of claim 39, wherein the ARI indicating one of the configured at least two PUCCH opportunities is dependent upon a carrier activation state.

41. The communication system of claim 26, wherein the indicated PUCCH opportunity further includes a PUCCH transmit diversity gain.

42. The communication system of claim 26, wherein the indicated PUCCH opportunity further includes a PUCCH power control setting.

43. The communication system of claim 26, wherein the indicated PUCCH opportunity further includes uplink control information, UCI.

44. The communication system of claim 43, wherein the UCI includes one or more of a channel status information, CSI, a channel quality indicator, CQI, and a scheduling request, SR.

45. The communication system of claim 26, further including the base station.

46. The communication system of claim 45, further including the UE, wherein the UE is configured to communicate with the base station.

47. The communication system of claim 46, wherein:
the processing circuitry of the host computer is configured to execute a host application, thereby providing the user data; and
the UE comprises processing circuitry configured to execute a client application associated with the host application.

* * * * *